United States Patent
Hwang et al.

(10) Patent No.: US 11,159,282 B2
(45) Date of Patent: Oct. 26, 2021

(54) METHOD AND APPARATUS FOR TRANSMITTING AND RECEIVING HARQ-ACK SIGNAL

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/752,212

(22) Filed: Jan. 24, 2020

(65) Prior Publication Data

US 2020/0162207 A1 May 21, 2020

Related U.S. Application Data

(63) Continuation of application No. PCT/KR2019/002355, filed on Feb. 27, 2019.

(60) Provisional application No. 62/636,119, filed on Feb. 27, 2018.

(51) Int. Cl.
*H04L 1/18* (2006.01)

(52) U.S. Cl.
CPC .......... *H04L 1/1893* (2013.01); *H04L 1/1812* (2013.01); *H04L 1/1896* (2013.01)

(58) Field of Classification Search
CPC . H04L 1/00; H04L 1/18; H04L 1/1812; H04L 1/1893; H04L 1/1896; H04L 5/001; H04L 5/0053; H04L 5/0055; H04L 5/0098
USPC ...................................................... 370/329
See application file for complete search history.

(56) References Cited

U.S. PATENT DOCUMENTS

| 2017/0187494 A1 | 6/2017 | Tirronen et al. |
| 2018/0270698 A1* | 9/2018 | Babaei ............ H04W 72/1284 |
| 2018/0324773 A1* | 11/2018 | Fu ................... H04L 5/0082 |
| 2020/0022175 A1* | 1/2020 | Xiong ............ H04W 72/042 |

FOREIGN PATENT DOCUMENTS

| JP | 2017208842 | 11/2017 |
| WO | WO2017193890 | 11/2017 |
| WO | WO2016158536 | 2/2018 |

OTHER PUBLICATIONS

MediaTek Inc. Remaining Details on Bandwidth Part Operation in NR R1-1801638 3GPP TSG RAN WG1 Athens, Greece, Feb. 26-Mar. 2, 2018. (Year: 2018).*

(Continued)

*Primary Examiner* — Omar J Ghowrwal
*Assistant Examiner* — Kokou R Detse
(74) *Attorney, Agent, or Firm* — Fish & Richardson P.C.

(57) ABSTRACT

The present disclosure discloses a method of transmitting a hybrid automatic repeat request-acknowledgement (HARQ-ACK) signal at a user equipment (UE) in a wireless communication system. Particularly, the method includes receiving at least one first physical downlink shared channel (PDSCH) related to the HARQ-ACK signal in a first bandwidth part (BWP), receiving downlink control information (DCI) for switching an active BWP related to a downlink signal from the first BWP to a second BWP, receiving at least one second PDSCH related to the HARQ-ACK signal in the second BWP, and transmitting the HARQ-ACK signal. The HARQ-ACK signal does not include HARQ-ACK information for the at least one first PDSCH.

5 Claims, 18 Drawing Sheets

(56) References Cited

OTHER PUBLICATIONS

3rd Generation Partnership Project; Technical Specification Group Radio Access Network; "NR; Physical layer procedures for control (Release 15)," 3GPP TS 38.213 V15.0.0, dated Dec. 2019, 56 pages.
Ericsson, "On remaining issues on carrier aggregation," R1-1802917, 3GPP TSG RAN WG1 Meeting #92, Athens, Greece, dated Feb. 26-Mar. 2, 2018, 15 pages.
LG Electronics, "Remaining issues on bandwidth part operation," R1-1802216, 3GPP TSG RAN WG1 Meeting #92, Athens, Greece, dated Feb. 26-Mar. 2, 2018, 10 pages.
LG Electronics, "Remaining issues on CA and HARQ-ACK codebook," R1-1802217, 3GPP TSG RAN WG1 Meeting #92, Athens, Greece, dated Feb. 26-Mar. 2, 2018, 6 pages.
MediaTek Inc., "Handle ongoing HARQ process when BWP switching occurs," R2-1713077, 3GPP TSG-RAN WG2 Meeting #100, Reno, Nevada, USA, Nov. 27-Dec. 1, 2017, 2 pages.
Panasonic, "Discussion on HARQ-ACK transmission due to BWP switching," R1-1802441, 3GPP TSG RAN WG1 Meeting #92, dated Feb. 26-Mar. 2, 2018, 2 pages.
Qualcomm Incorporated, "Granularity of HARQ timing parameters with BWP," R2-1713807, 3GPP TSG RAN WG2 NR #100, Reno, USA, dated Nov. 27-Dec. 1, 2017, 2 pages.
Vivo, "Remaining issues on CBG-based (re)transmission," R1-1801541, 3GPP TSG RAN WG1 Meeting #92, Athens, Greece, dated Feb. 26-Mar. 2, 2018, 3 pages.
Extended European Search Report in European Appln. No. 19761510.7, dated Jun. 19, 2020, 7 pages.
Huawei, HiSilicon, Summary of remaining issues on NR CA, R1-1801348, 3GPP TSG RAN WG1 Meeting #92, Athens, Greece, Feb. 26-Mar. 2, 2018, 7 pages.
MediaTek Inc., Remaining Details on Bandwidth Part Operation in NR, R1-1801638, 3GPP TSG RAN WG1 Meeting #92, Athens, Greece, Feb. 26-Mar. 2, 2018, 11 pages.
IN Office Action in Indian Appln. No. 201927036811, dated Jan. 29, 2021, 8 pages (with English translation).

* cited by examiner

FIG. 1
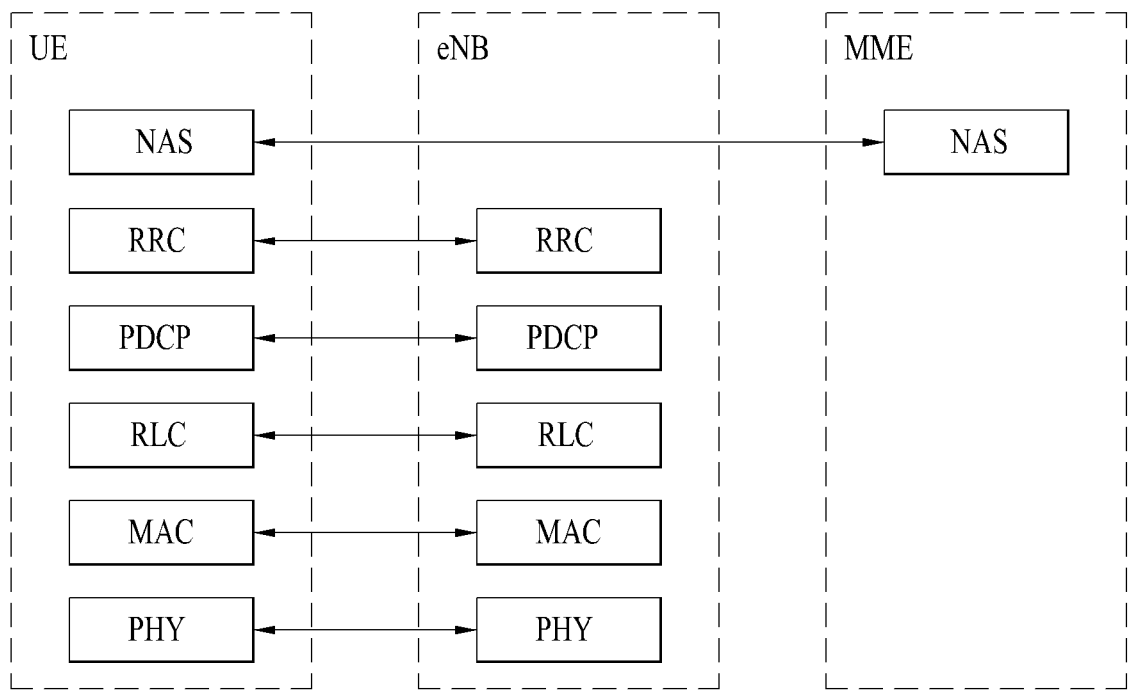
(A) CONTROL-PLANE PROTOCOL STACK
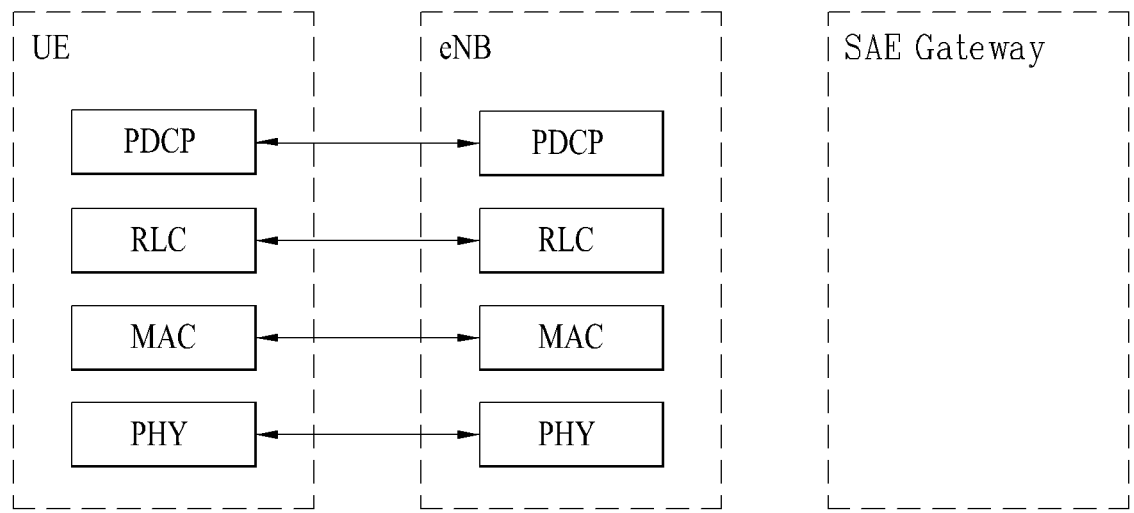
(B) USER-PLANE PROTOCOL STACK FIG. 10
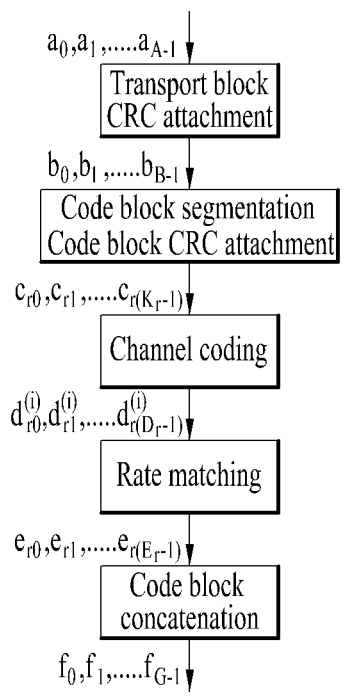
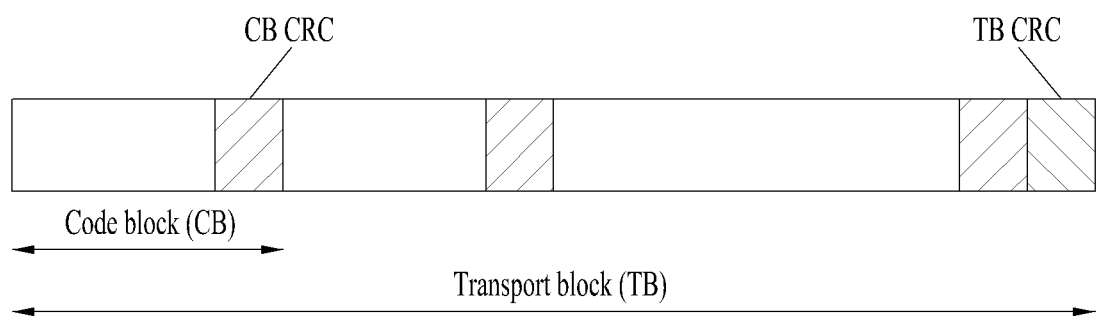

FIG. 13

| | C-DAI=3<br>T-DAI=4 | C-DAI=1<br>T-DAI=3 | | C-DAI=2<br>T-DAI=3 | |
|---|---|---|---|---|---|
| C-DAI=1<br>T-DAI=2 | | C-DAI=2<br>T-DAI=3 | C-DAI=4<br>T-DAI=1 | | |
| C-DAI=2<br>T-DAI=2 | C-DAI=4<br>T-DAI=4 | C-DAI=3<br>T-DAI=3 | C-DAI=1<br>T-DAI=1 | C-DAI=3<br>T-DAI=3 | C-DAI=4<br>T-DAI=4 |

METHOD AND APPARATUS FOR TRANSMITTING AND RECEIVING HARQ-ACK SIGNAL

CROSS-REFERENCE TO RELATED APPLICATIONS

This application is a continuation of International Application No. PCT/KR2019/002355, filed on Feb. 27, 2019, which claims the benefit of U.S. Provisional Application No. 62/636,119, filed on Feb. 27, 2018. The disclosures of the prior applications are incorporated by reference in their entirety.

TECHNICAL FIELD

The present disclosure relates to a method and apparatus for transmitting and receiving a hybrid automatic repeat request-acknowledgement (HARQ-ACK) signal, and more particularly, to a method and apparatus for, when bandwidth part (BWP) switching takes place, transmitting and receiving an HARQ-ACK for data received in a BWP prior to the switching.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure is to provide a method and apparatus for transmitting and receiving a hybrid automatic repeat request-acknowledgement (HARQ-ACK) signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting a hybrid automatic repeat request-acknowledgement (HARQ-ACK) signal at a user equipment (UE) in a wireless communication system includes receiving at least one first physical downlink shared channel (PDSCH) related to the HARQ-ACK signal in a first bandwidth part (BWP), receiving downlink control information (DCI) for switching an active BWP related to a downlink signal from the first BWP to a second BWP, receiving at least one second PDSCH related to the HARQ-ACK signal in the second BWP, and transmitting the HARQ-ACK signal. The HARQ-ACK signal may not include HARQ-ACK information for the at least one first PDSCH.

The HARQ-ACK signal may include HARQ-ACK information for the at least one second PDSCH.

Further, the number of bits for the HARQ-ACK signal may be based on the number of candidate PDSCH reception occasions in slots after the active BWP is switched to the second BWP, among candidate PDSCH reception occasions related to a feedback timing of the HARQ-ACK signal.

Further, the number of bits for the HARQ-ACK signal may be based on the sum of the number of areas in slots after the active BWP is switched to the second BWP, among areas for a PDSCH which is not scheduled by PDCCH monitoring occasions associated with the HARQ-ACK signal and the number of the at least one second PDSCH.

Further, the HARQ-ACK signal may be generated in a semi-static HARQ-ACK codebook scheme.

Further, the HARQ-ACK signal may be transmitted on a physical uplink control channel (PUCCH).

According to another aspect of the present disclosure, a communication apparatus for transmitting a HARQ-ACK signal at a UE in a wireless communication system includes a memory, and a processor connected to the memory. The processor is configured to control reception of at least one first PDSCH related to the HARQ-ACK signal in a first BWP, reception of DCI for switching an active BWP related to a downlink signal from the first BWP to a second BWP, reception of at least one second PDSCH related to the HARQ-ACK signal in the second BWP, and transmission of the HARQ-ACK signal. The HARQ-ACK signal may not include HARQ-ACK information for the at least one first PDSCH.

The HARQ-ACK signal may include HARQ-ACK information for the at least one second PDSCH.

Further, the number of bits for the HARQ-ACK signal may be based on the number of candidate PDSCH reception occasions in slots after the active BWP is switched to the second BWP, among candidate PDSCH reception occasions related to a feedback timing of the HARQ-ACK signal.

Further, the number of bits for the HARQ-ACK signal may be based on the sum of the number of areas in slots after the active BWP is switched to the second BWP, among areas for a PDSCH which is not scheduled by PDCCH monitoring occasions associated with the HARQ-ACK signal and the number of the at least one second PDSCH.

Further, the HARQ-ACK signal may be generated in a semi-static HARQ-ACK codebook scheme.

Further, the HARQ-ACK signal may be transmitted on a PUCCH.

According to another aspect of the present disclosure, a method of receiving a HARQ-ACK signal at a base station (BS) in a wireless communication system includes transmitting at least one first PDSCH related to the HARQ-ACK signal in a first BWP, transmitting downlink control information (DCI) for switching an active BWP related to a downlink signal from the first BWP to a second BWP, transmitting at least one second PDSCH related to the HARQ-ACK signal in the second BWP, and receiving the HARQ-ACK signal. The HARQ-ACK signal may not include HARQ-ACK information for the at least one first PDSCH.

Advantageous Effects

According to the present disclosure, even when a bandwidth part (BWP) is dynamically changed, a hybrid automatic repeat request-acknowledgement (HARQ-ACK) codebook is efficiently generated, thereby enabling efficient HARQ-ACK transmission.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.

FIGS. 10 and 11 are views illustrating code block group (CBG)-based HARQ-ACK transmission in the NR system.

FIGS. 12 to 14 are views illustrating HARQ-ACK transmission in carrier aggregation (CA).

BEST MODE FOR CARRYING OUT THE INVENTION

Figure 2:
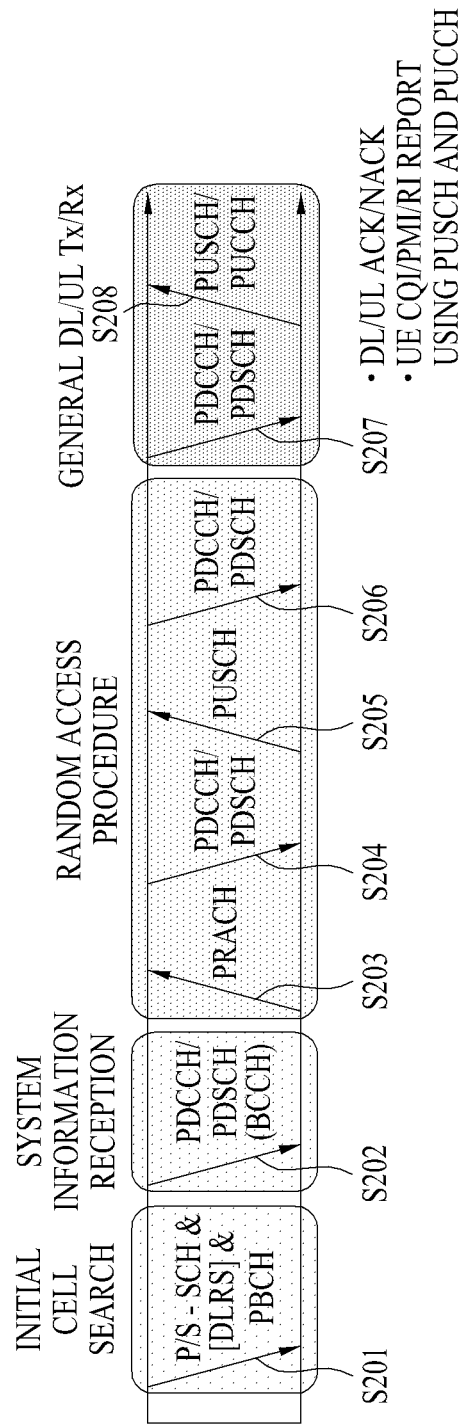
FIG. 2 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/

NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
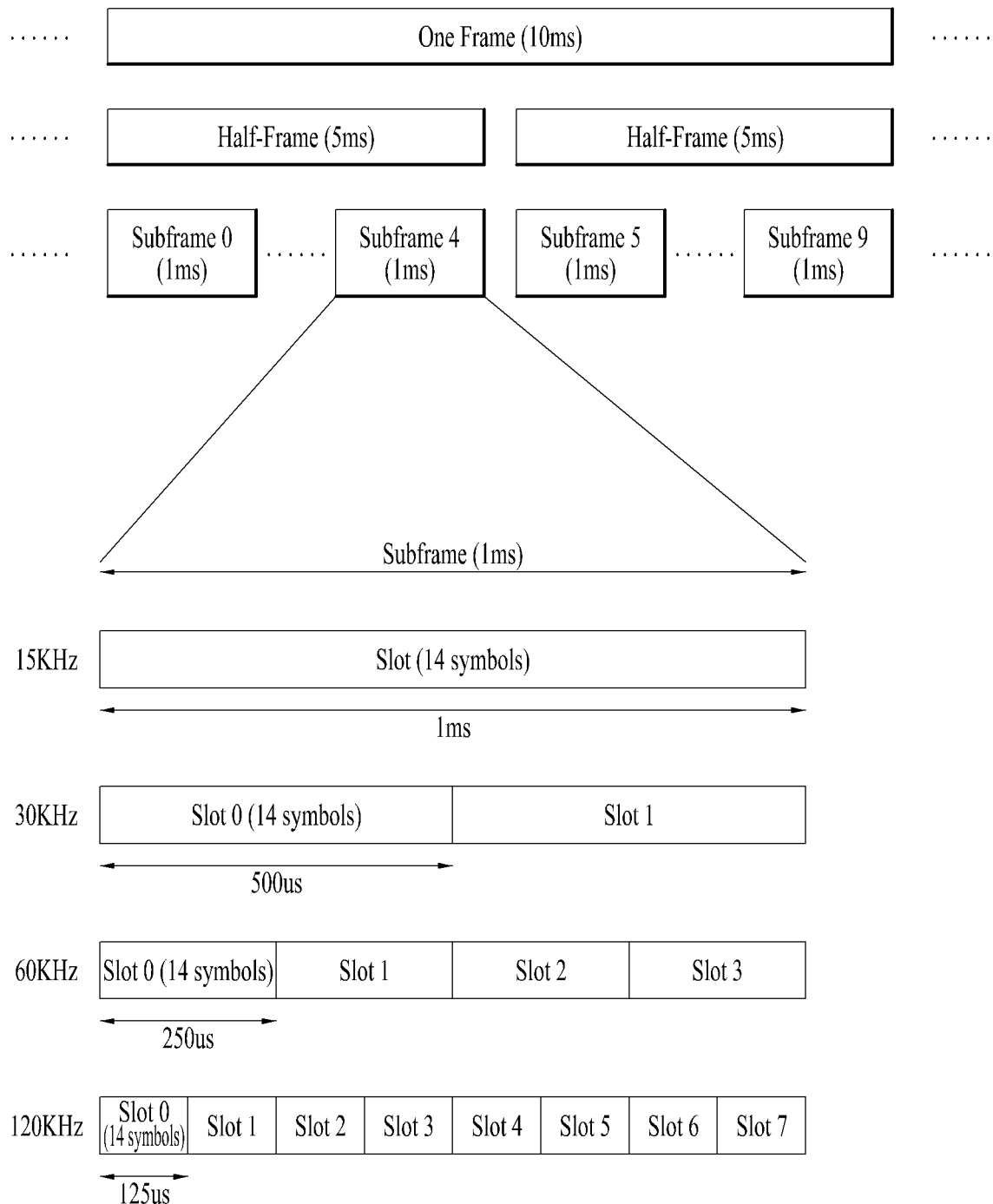
FIGS. 3 to 5 are views illustrating structures of a radio frame and slots used in the NR system.

FIG. 3 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot *$N^{frame, u}_{slot}$: Number of slots in a frame
*$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 4:
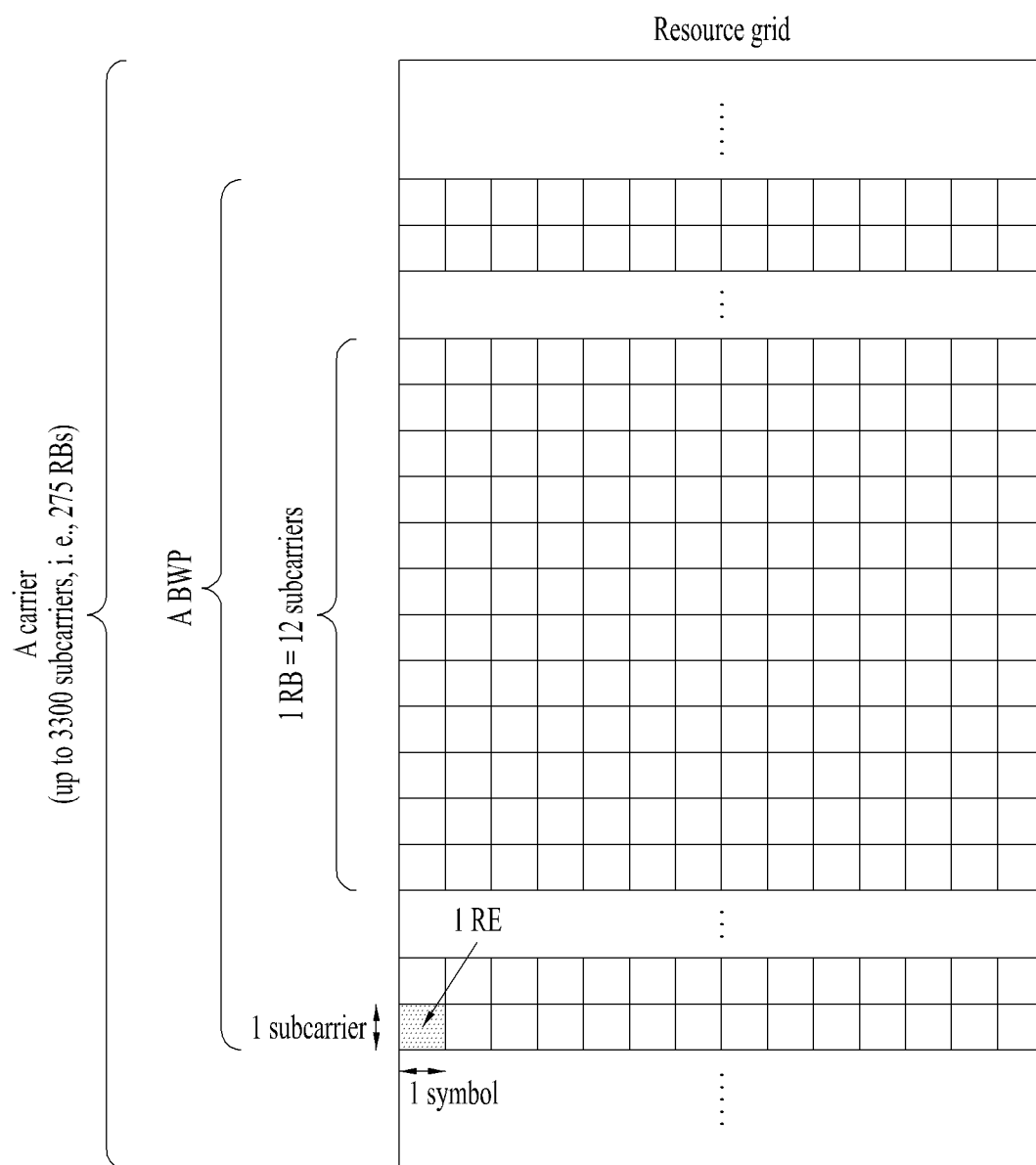

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
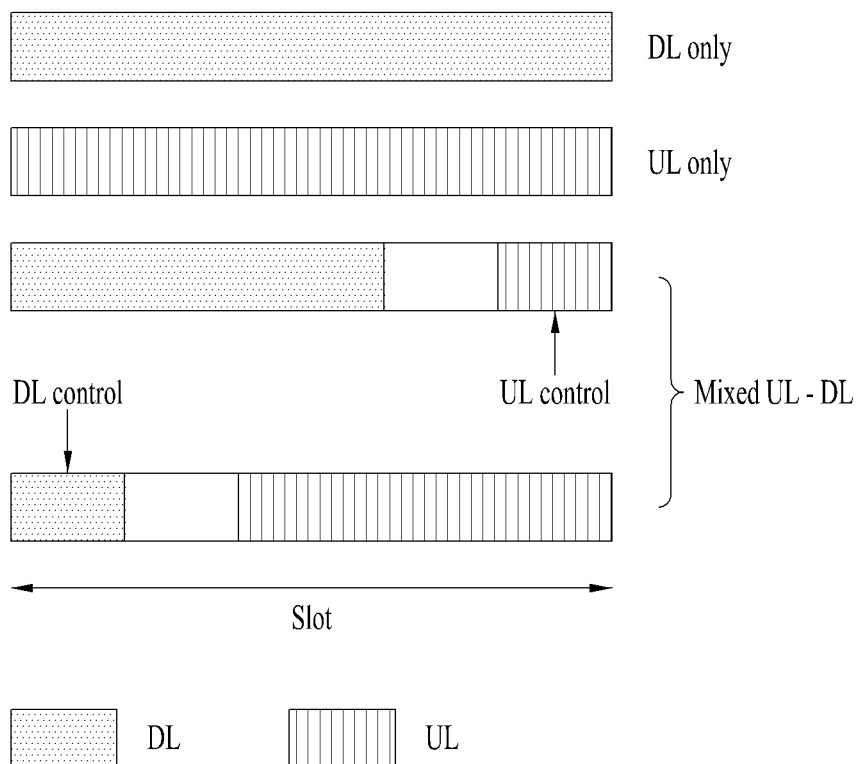

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+DL data region
    UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For NR system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with a received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present invention to be described later are proposed in consideration of constraints resulting from the characteristics of analog BF or hybrid BF.

FIG. 5 abstractly illustrates a hybrid beamforming structure in terms of TXRUs and physical antennas.

Figure 8:
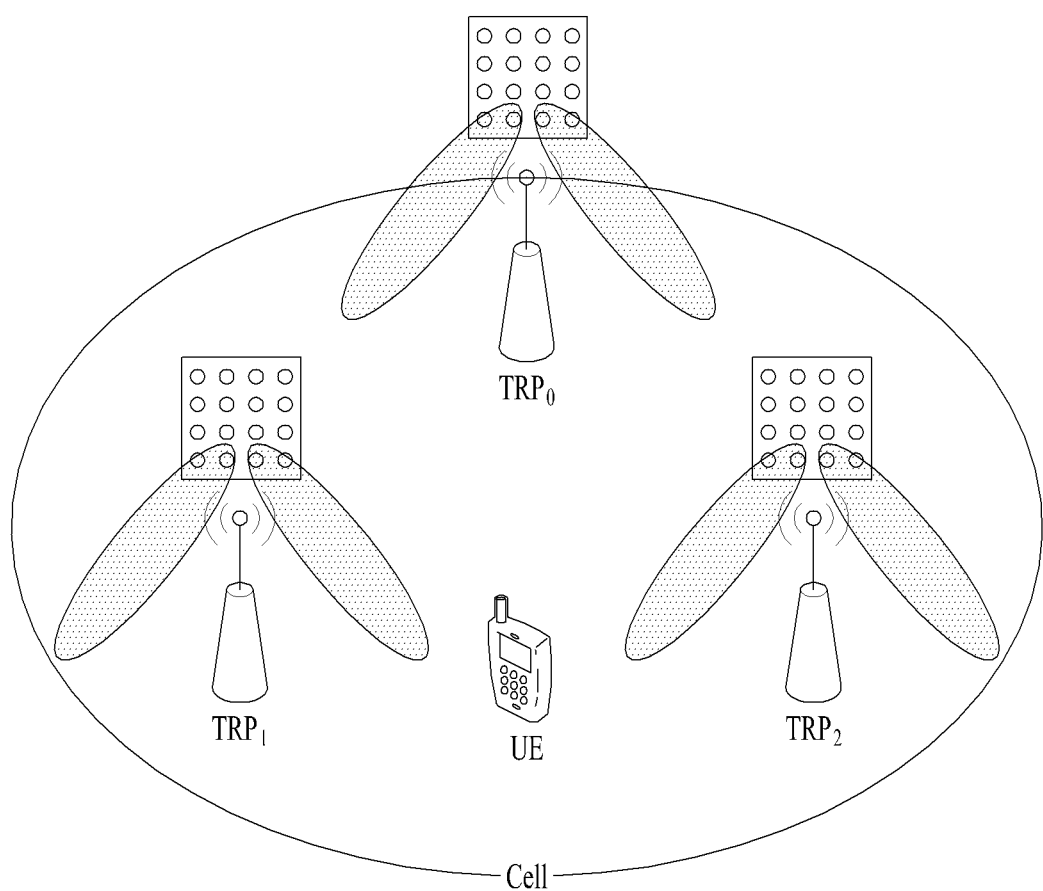
FIG. 8 is a view illustrating an exemplary cell in an NR system.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 8, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 6:
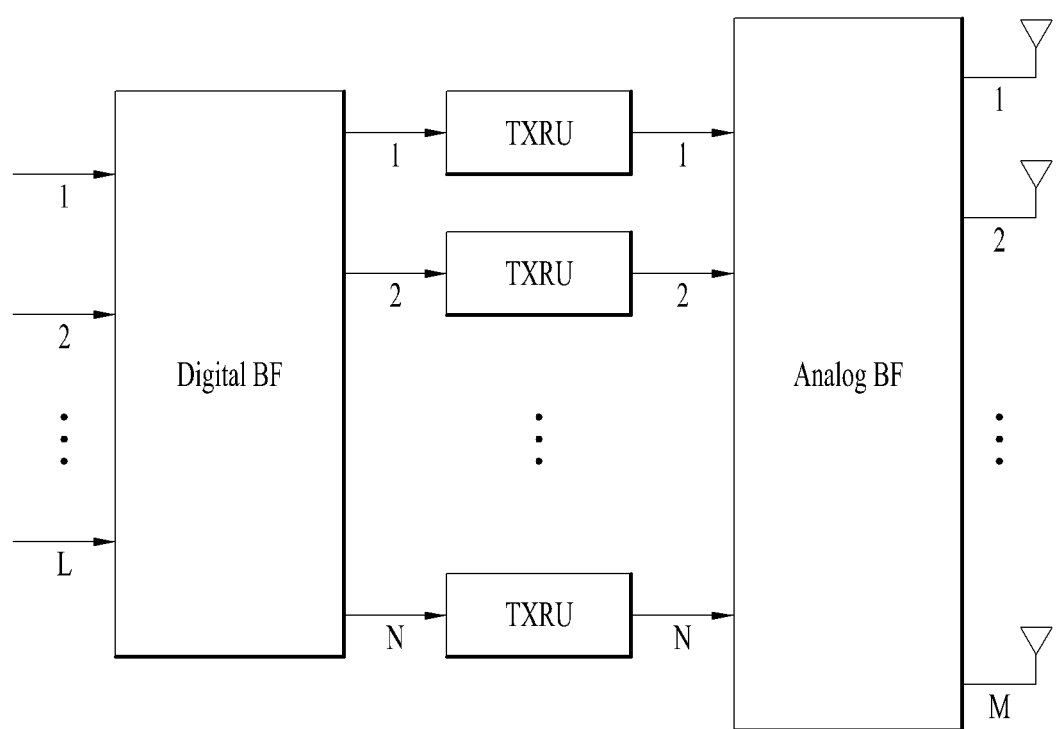
FIG. 6 is a view illustrating exemplary connection schemes between transceiver units (TXRUs) and antenna elements.
Figure 9:
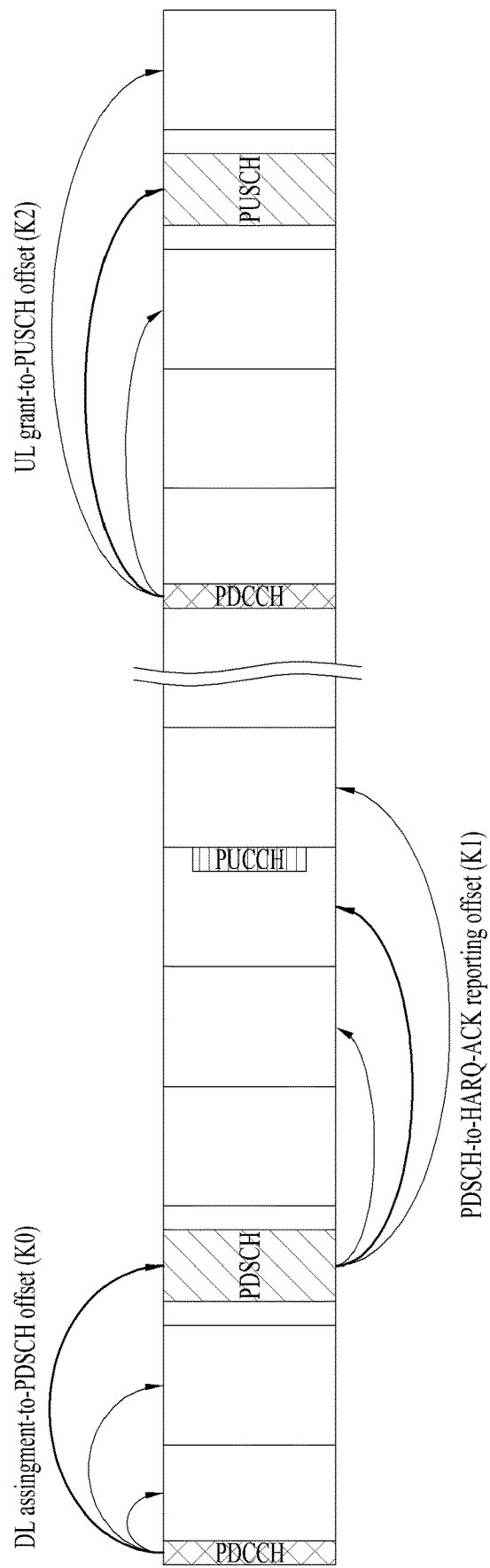
FIG. 9 is a view illustrating a hybrid automatic repeat request-acknowledgement (HARQ-ACK) timing in a new RAT (NR) system.

FIG. 6 is a view illustrating beam sweeping for an SS and system information during DL transmission. In FIG. 6, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 9 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 7:
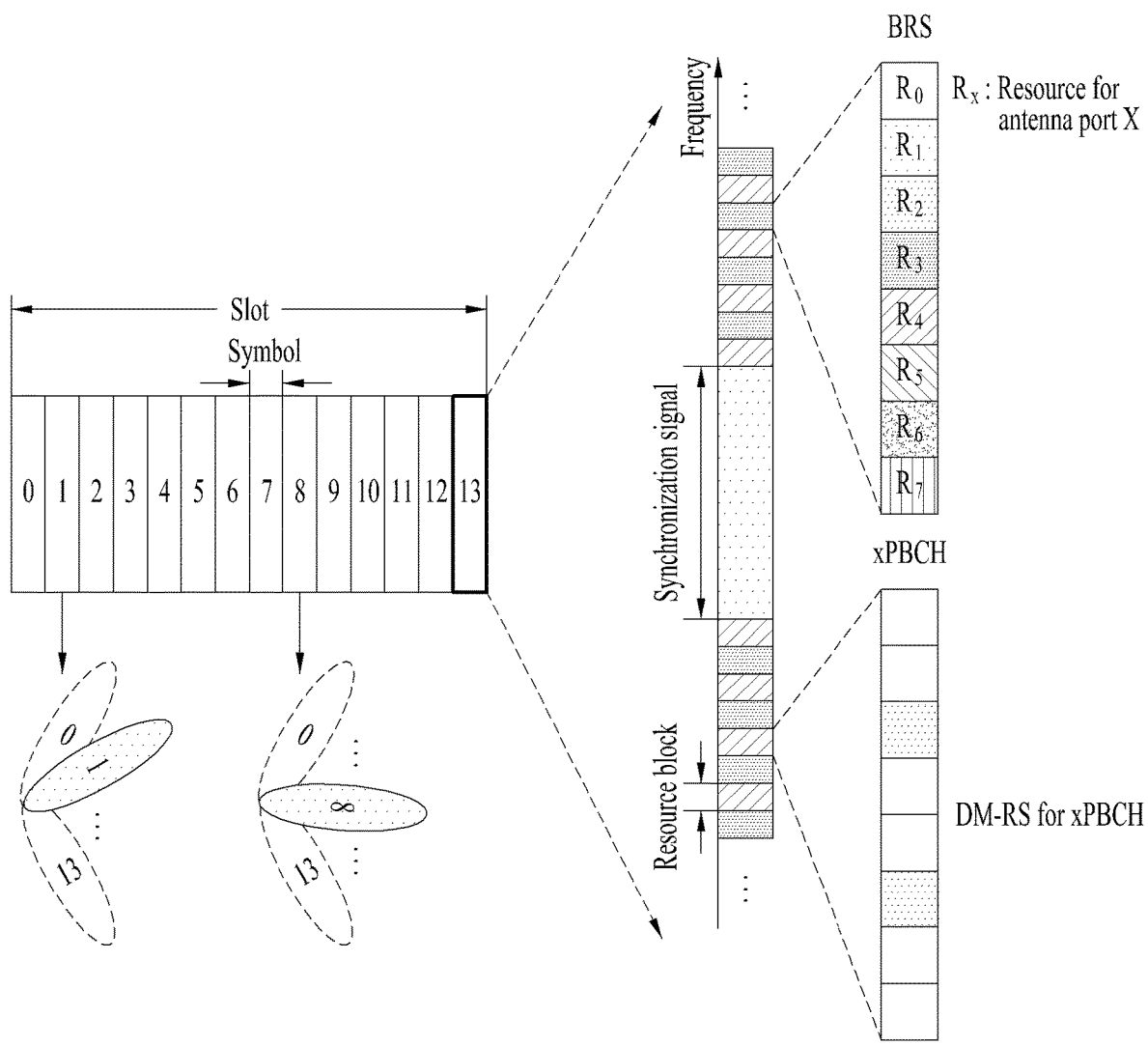
FIG. 7 is a view illustrating beam sweeping for a synchronization signal and system information during downlink (DL) transmission.

FIG. 7 is a view illustrating an exemplary cell in the NR system.

Referring to FIG. 10, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Bandwidth Part (BWP)

The NR system may support up to 400 MHz per carrier. If a UE operating in such a wideband carrier always keeps a radio frequency (RF) module on for the whole carrier, the UE may suffer from great battery consumption. Considering multiple use cases (e.g., eMBB, URLLC, mMTC, V2X, etc.) in one wideband carrier, different numerologies (e.g., subcarrier spacings) may be supported for different frequency bands of the carrier. Each UE may have a different capability regarding a maximum bandwidth. In this regard, an eNB may indicate a UE to operate only in a part of the bandwidth of the wideband carrier, not across the total bandwidth. Such a partial bandwidth is referred to as a BWP. A BWP is a subset of contiguous common resource blocks defined for numerology $\mu_i$ in BWP i in the frequency domain, and one numerology (e.g., subcarrier spacing, CP length, or slot/mini-slot duration) may be configured for the BWP.

The gNB may configure one or more BWPs in one carrier configured for the UE. If UEs are concentrated in a specific BWP, some UEs may be switched to another BWP, for load balancing. For frequency-domain inter-cell interference cancellation between adjacent cells, BWPs at both ends of the total bandwidth of a cell except for some center spectrum may be configured in the same slot. That is, the gNB may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), indicate the UE to switch to another configured DL/UL BWP (by L1 signaling, a MAC CE, or RRC signaling), or set a timer value and switch the UE to a predetermined DL/UL BWP upon expiration of the timer value. To indicate switching to another configured DL/UL BWP, DCI format 1_1 or DCI format 0_1 may be used. Particularly, an activated DL/UL BWP is referred to as an active DL/UL BWP. During initial access or before RRC connection setup, the UE may not receive a DL/UL BWP configuration. A DL/UL BWP that the UE assumes in this situation is referred to as an initial active DL/UL BWP.

A DL BWP is a BWP used to transmit and receive a DL signal such as a PDCCH and/or a PDSCH, and a UL BWP is a BWP used to transmit and receive a UL signal such as a PUCCH and/or a PUSCH.

Hybrid Automatic Repeat reQuest (HARQ)

In relation to a UE operation for reporting control information, an HARQ-ACK operation will be described. An HARQ-ACK is information indicating whether a UE has successfully received a physical DL channel. If the UE has successfully received the physical DL channel, the UE feeds back an acknowledgement (ACK) to a gNB, and otherwise, the UE feeds back a negative ACK (NACK) to the gNB. In NR, HARQ supports an HARQ-ACK feedback of 1 bit per transport block (TB). FIG. 9 is a view illustrating an exemplary HARQ-ACK timing K1.

In FIG. 9, K0 represents the number of slots from a slot with a PDCCH carrying a DL assignment (i.e., a DL grant) to a slot with a PDSCH corresponding to the PDCCH. K1 represents the number of slots from a slot carrying a PDSCH to a slot carrying an HARQ-ACK for the PDSCH. K2 represents the number of slots from a slot with a PDCCH carrying a UL grant to a slot carrying a PUSCH corresponding to the PDCCH. K0, K1 and K2 may be summarized below in [Table 3].

TABLE 3

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

The gNB may indicate an HARQ-ACK feedback timing to the UE dynamically by DCI or semi-statically by RRC signaling.

NR supports different minimum HARQ processing times for different UEs. An HARQ processing time includes a delay between a DL data reception timing and an HARQ-ACK transmission timing and a delay between a UL grant reception timing and a UL data transmission timing. The UE transmits information about the capability of its minimum HARQ processing time to the gNB. From the perspective of the UE, HARQ-ACK/NACK feedbacks for a plurality of DL transmissions in the time domain may be transmitted in one UL data/control region. A timing between DL data reception and corresponding ACK transmission is indicated by DCI.

Compared to the LTE system in which an HARQ process is performed on a TB basis or a codeword basis, the NR system supports code block group (CBG)-based HARQ-ACK feedback transmission of a single-bit/multi-bit HARQ-ACK feedback. A TB may be mapped to one or more code blocks (CBs) according to the size of the TB. For example, a CRC is attached to the TB during channel coding. If the CRC-attached TB is equal to or smaller than a predetermined size, the CRC-attached TB corresponds to one CB. On the contrary, if the CRC-attached TB is larger than the predetermined size, the CRC-attached TB is segmented into a plurality of CBs. In the NR system, a UE may be configured to receive CBG-based transmissions, and a retransmission may be scheduled such that a subset of all CBs of the TB are delivered at the retransmission.

CBG-Based HARQ Process

LTE supports a TB-based HARQ process, whereas NR supports a CBG-based HARQ process along with a TB-based HARQ process.

FIG. 10 illustrates an exemplary TB process and an exemplary TB structure. The process illustrated in FIG. 10 is applicable to data of transport channels including downlink shared channel (DL-SCH), paging channel (PCH), and multicast channel (MCH). A UL TB (or data of a UL transport channel) may also be processed in a similar manner.

Referring to FIG. 10, a transmitter adds a (e.g., 24-bit) CRC (TB CRC) to a TB, for error check. Subsequently, the transmitter may divide the CRC-attached TB into a plurality of CBs in consideration of the size of a channel encoder. For example, the maximum size of a CB is 6144 bits in LTE. Therefore, if the size of the TB is equal to or less than 6144 bits, a CB is not constructed. If the size of the TB is larger than 6144 bits, the TB is divided into 6144-bit segments, and thus a plurality of CBs are constructed. For error check, a (e.g., 24-bit) CRC (CB CRC) is added to each individual CB. The CBs are concatenated into a codeword after channel coding and rate matching. In the TB-based HARQ process, data scheduling and a related HARQ process are performed on a TB basis, and a CB CRC is used to determine early termination of TB decoding.

Figure 11:
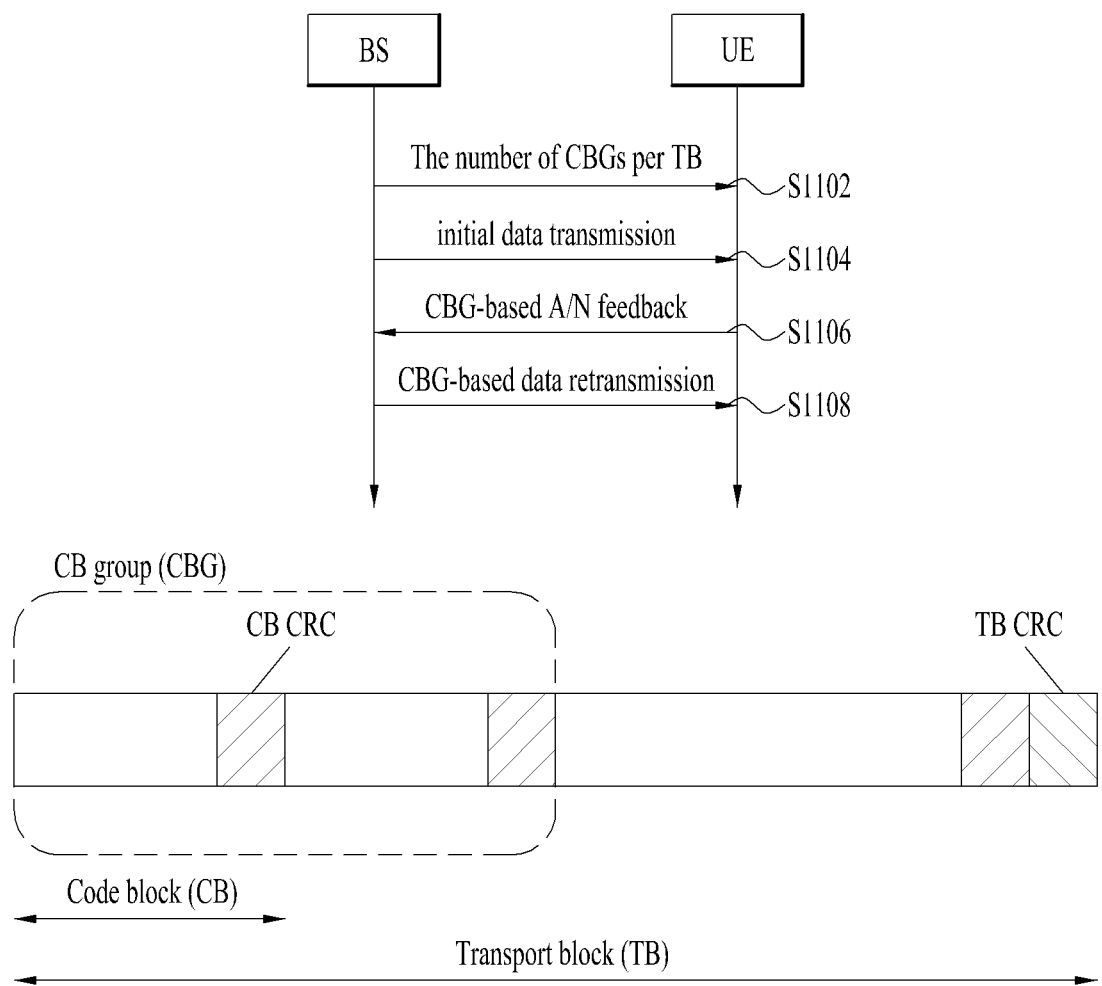

FIG. 11 illustrates an exemplary CBG-based HARQ process. In the CBG-based HARQ process, data scheduling and a related HARQ process may be performed on a TB basis.

Referring to FIG. 11, a UE may receive, from a gNB, information about the number M of CBGs per TB by a higher-layer signal (e.g., an RRC signal) (S1102). The UE may then receive an initial data transmission (on a PDSCH) from the gNB (S1104). The data may include a TB, the TB may include a plurality of CBs, and the plurality of CBs may be divided into one or more CBGs. Each of some of the CBGs may include ceiling(K/M) CBs, and the other CBG may include flooring (K/M) CBs. K represents the number of CBs in the data. Subsequently, the UE may feed back CBG-based A/N information for the data to the gNB (S1106), and the gNB may perform a CGB-based data retransmission (S1108). The A/N information may be transmitted on a PUCCH or a PUSCH. The A/N information may include a plurality of A/N bits for the data, each A/N bit indicating an A/N response generated on a CBG basis for the data. The payload size of the A/N information may be maintained equal according to M irrespective of the number of CBGs in the data.

Dynamic/Semi-Static HARQ-ACK Codebook

In NR, a dynamic HARQ-ACK codebook scheme and a semi-static HARQ-ACK codebook scheme are supported. An HARQ-ACK (or A/N) codebook may be replaced with HARQ-ACK payload.

If the dynamic HARQ-ACK codebook scheme is configured, the size of A/N payload varies with the number of actually scheduled DL data. For this purpose, a PDCCH related to DL scheduling includes counter-downlink assignment index (counter-DAI) and total-DAI. The counter-DAI indicates a {CC, slot} scheduling order value calculated in a component carrier (CC)-first manner (or a cell-first manner), and is used to determine the positions of A/N bits in an A/N codebook. The total-DAI indicates a slot-based scheduling accumulative value of up to a current slot, and is used to determine the size of the A/N codebook.

If the semi-static A/N codebook scheme is configured, the size of an A/N codebook is fixed (to a maximum value) irrespective of the number of actually scheduled DL data. Specifically, (the maximum size of) A/N payload transmitted on one PUCCH in one slot may be determined to be the number of A/N bits corresponding to a combination (bundling window) of all CCs configured for the UE and all DL scheduling slots for which an A/N transmission timing may be indicated (or PDSCH transmission slots or PDCCH monitoring slots). For example, DL grant DCI (a PDCCH) may include PDSCH-to-A/N timing information, and the PDSCH-to-A/N timing information may have one (e.g., k) of a plurality of values. For example, if a PDSCH is received in slot #m and PDSCH-to-A/N timing information in DL grant DCI (a PDCCH) that schedules the PDSCH indicates k, A/N information for the PDSCH may be transmitted in slot #(m+k). For example, k∈{1, 2, 3, 4, 5, 6, 7, 8}. If the A/N information is transmitted in slot #n, the A/N information may include an allowed maximum number of A/Ns based on a bundling window. That is, A/N information in slot #n may include an A/N corresponding to slot #(n−k). For example, if k∈{1, 2, 3, 4, 5, 6, 7, 8}, A/N information in slot #n includes A/Ns corresponding to slot #(n−8) to slot #(n−1) (i.e., a maximum number of A/Ns) irrespective of actual DL data reception. Herein, the term A/N information may be replaced with A/N codebook or A/N payload.

Further, a slot may be understood/replaced as/with a candidate occasion for DL data reception. As in the above example, a bundling window may be determined according to a PDSCH-to-A/N timing with respect to an A/N slot, and a PDSCH-to-A/N timing set may have predefined values (e.g., {1, 2, 3, 4, 5, 6, 7, 8}) or configured by higher-layer (RRC) signaling.

Now, a description will be given of methods of transmitting and receiving an HARQ-ACK according to embodiments of the present disclosure.

In a 5G NR system, a BWP may be changed dynamically to achieve the purpose of energy saving and/or load balancing through RF/baseband switching.

Further, BWP switching may lead to a change in an HARQ-ACK codebook configuration, CSI reporting, and so on. Particularly in carrier aggregation (CA), if a BWP is changed independently in each cell, there is a need for defining an HARQ-ACK codebook configuration and a CSI configuration method according to the changed BWP.

In the present disclosure, a description will be given of an HARQ-ACK transmission method, in the case where a different HARQ-ACK transmission method is applied to each BWP, for example, when different BWPs use a semi-static HARQ-ACK codebook and a dynamic HARQ-ACK codebook or a TB-based HARQ-ACK and a CBG-based HARQ-ACK, respectively, or when there are PDCCH monitoring occasions on a BWP basis. An HARQ-ACK transmission method in the process of changing a BWP through BWP switching will also be described. Notably, the present disclosure may be extended to transmission of other UCI such as CSI, not limited to HARQ-ACK transmission.

HARQ-ACK feedback transmission methods basically include a semi-static HARQ-ACK codebook scheme and a dynamic HARQ-ACK codebook scheme in the NR system.

In the semi-static HARQ-ACK codebook scheme, HARQ-ACK bits are generated/transmitted for all PDCCH monitoring occasions associated with a specific PUCCH transmission timing in consideration of a plurality of PDSCH-to-HARQ-ACK feedback timings configured for a UE. A PDSCH which has not been scheduled via the PDCCH monitoring occasions may be processed as NACK.

In other words, among PDSCH reception occasions in which PDSCH reception may be expected in a plurality of slots based on a PDSCH-to-HARQ-ACK feedback timing associated with a specific PUCCH transmission timing (i.e., an HARQ-ACK transmission timing), PDSCH reception occasions except for PDSCH reception occasions for which a PDCCH transmission is impossible based on the PDSCH-to-HARQ-ACK feedback timing, that is, PDSCH reception occasions except for PDSCH reception occasions which may not be scheduled by a PDCCH are referred to as candidate PDSCH reception occasions.

Among the candidate PDSCH reception occasions, PDSCH reception occasions in which a PDSCH is not scheduled in actual PDCCH monitoring occasions and thus is not received may be processed as NACK.

On the other hand, in the dynamic HARQ-ACK codebook scheme, a total-DAI field and/or a counter-DAI field are configured in DCI, and an HARQ-ACK bit may be generated/transmitted for a PDSCH which has actually been scheduled by PDCCH monitoring occasions based on the corresponding DAI value.

If CA is applied, HARQ-ACK transmissions for a plurality of cells may be multiplexed and transmitted on one PUCCH.

Figure 12:
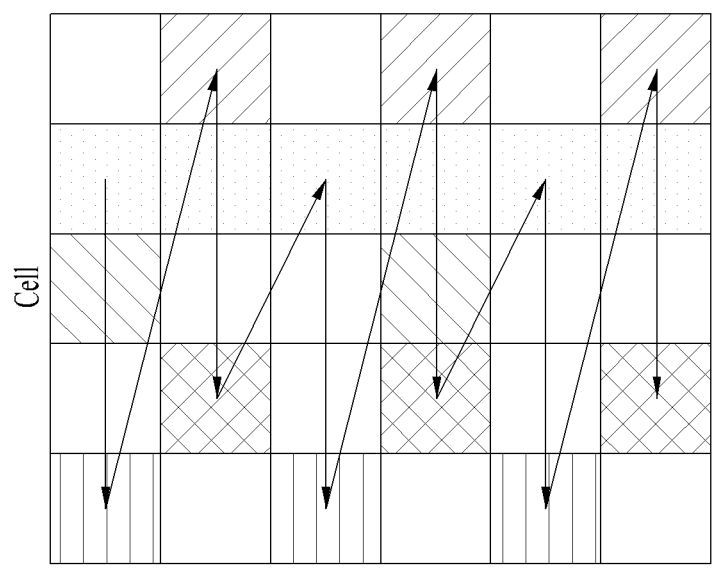

When a semi-static HARQ-ACK codebook is used, HARQ-ACK bits may be generated in an ascending order of cell indexes, starting from the earliest PDCCH monitoring occasion in time in the union of the PDCCH monitoring occasions of cells, as illustrated in FIG. 12. When a dynamic HARQ-ACK codebook is used, in the presence of DCI that schedules a PDSCH in a corresponding cell, an HARQ-ACK may be generated based on the DCI, as illustrated in FIG. 13.

In the NR system, CBG-based retransmission and/or HARQ-ACK feedback may be configured for each serving cell, and the number of CBG-based HARQ-ACK bits and/or the maximum number of CBG-based HARQ-ACK bits may also be configured for each serving cell. In the case of the semi-static HARQ-ACK codebook, it may be determined whether a TB-based HARQ ACK is generated for each PDCCH monitoring occasion, or a CBG-based HARQ-ACK bit is generated based on the number of CBGs and/or the maximum number of CBGs configured for each serving cell, depending on whether CBG-based HARQ-ACK is configured for each cell. A TB-based HARQ-ACK may be generated in one or two bits according to the maximum number of TBs.

Figure 14:
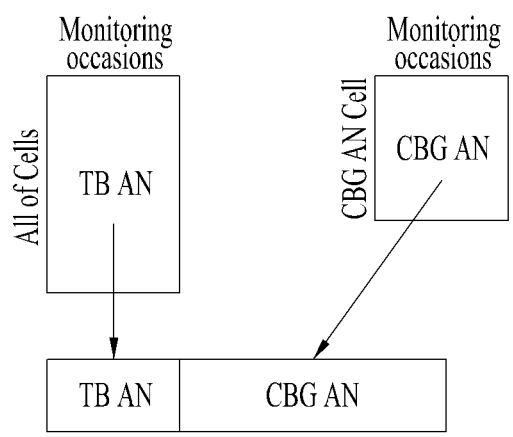

In the case of the dynamic HARQ-ACK codebook, as illustrated in FIG. 14, HARQ-ACK bits are generated for all serving cells based on TB-based HARQ-ACK, and only for serving cells configured with CBG transmission, as many HARQ-ACK bits as the number of CBGs scheduled for each serving cell are additionally generated based on the maximum number of CBGs configured for each serving cell (across different serving cells). The maximum number of CBGs may be the double of the maximum number of configured TBs.

The UE may perform PDCCH monitoring only in a current configured active DL BWP. A CORESET and/or a search space may be configured independently in each BWP. The search space may include time-domain monitoring occasions for a PDCCH.

However, if PDCCH monitoring occasions are different according to BWPs, an HARQ-ACK codebook configuration may also have to be changed dynamically. Further, a range of PDSCH-to-HARQ-ACK feedback timing values may also be configured for each BWP. In this case, an HARQ-ACK codebook configuration may also be changed.

If a BWP is changed, an HARQ-ACK codebook configuration may be ambiguous in some period. For example, PDCCH monitoring occasions associated with an HARQ feedback time in an old BWP before BW switching overlap over multiple PDCCH monitoring occasions with PDCCH monitoring occasions associated with an HARQ feedback time in a new BWP after the BWP switching, ambiguity may occur to the HARQ-ACK codebook configuration in the overlapped PDCCH monitoring occasions.

Under circumstances, the size of an HARQ-ACK codebook or the bits of the HARQ-ACK codebook may vary. For example, it is assumed that a PDSCH-to-HARQ-ACK timing set is configured in slots {4, 5, 6, 7} in BWP #1, and a PDSCH-to-HARQ-ACK timing set is configured in slots {4, 6} in BWP #2.

For example, it is assumed that when an HARQ-ACK feedback is transmitted in slot n, BWP #1 is operated until before slot n−4 and BWP #2 is operated from slot n−4. Then, it may be ambiguous to the UE whether to transmit a 4-bit HARQ-ACK for slots n−7, n−6, n−5, and n−4 and/or a 2-bit HARQ-ACK for slot n−6 and n−4 in slot n. Particularly in CA, as the size of an HARQ-ACK is changed, a whole HARQ-ACK codebook configuration may have to be changed. However, the PDSCH-to-HARQ-ACK timing set relationship based on the above assumption may be extended by a PDCCH-to-PDSCH timing-based combination.

Specific embodiments of a method of configuring an HARQ-ACK codebook according to BWP switching will be described below.

Figure 16:
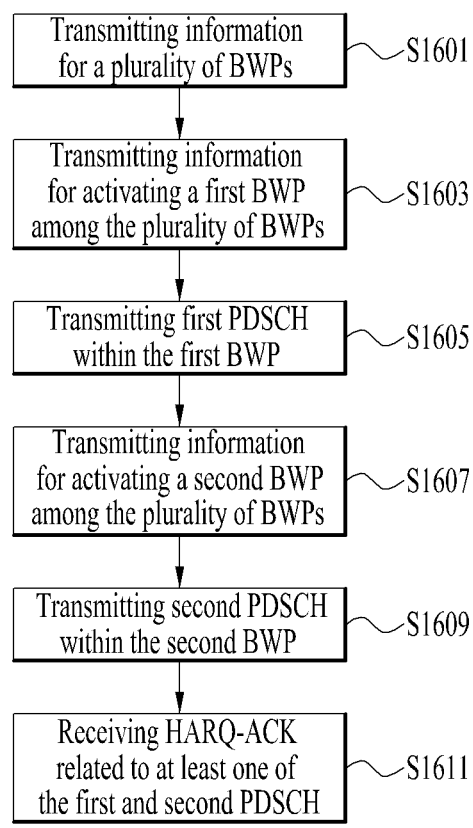
Figure 17:
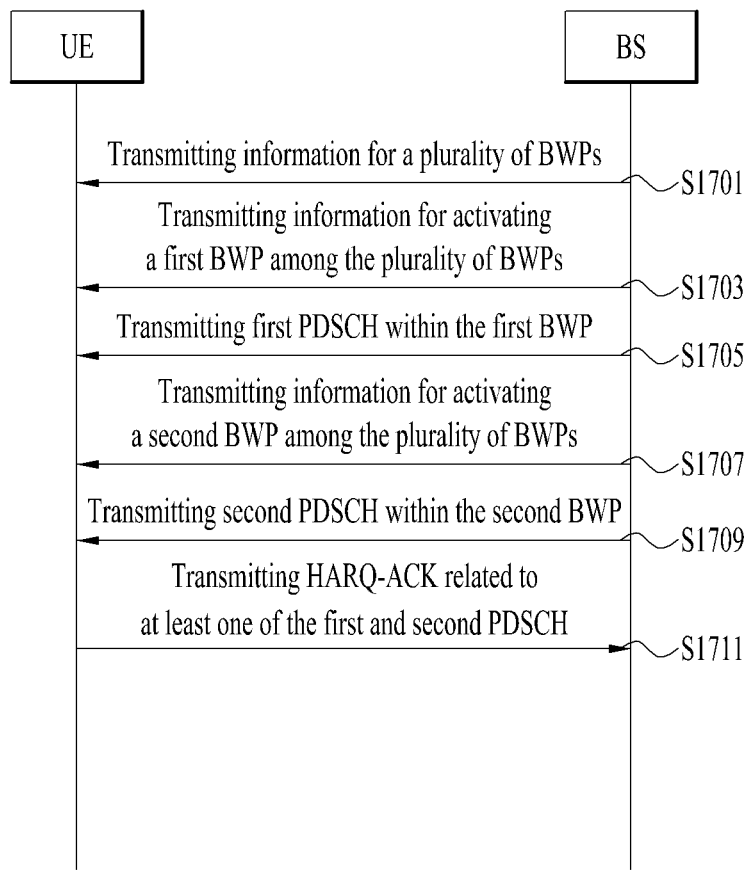

Before the description, operations of a UE, a gNB, and a network according to an embodiment of the present disclosure will be described with reference to FIGS. 15, 16 and 17.

Figure 15:
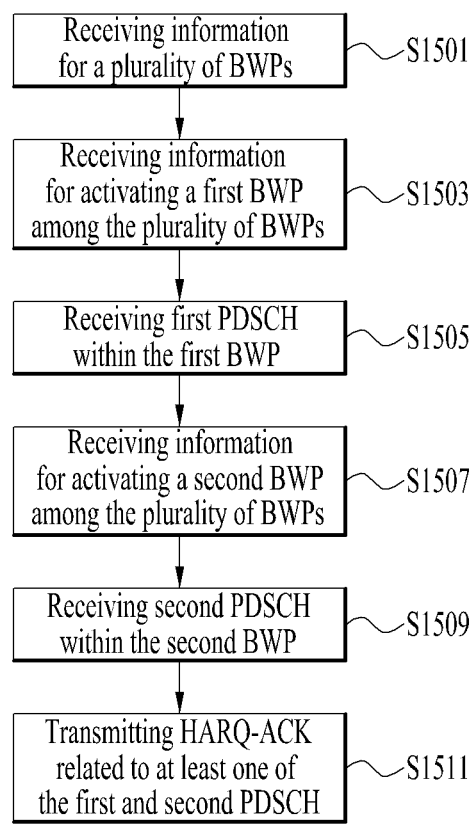
FIGS. 15 to 17 are views illustrating operations of transmitting and receiving an HARQ-ACK from the perspectives of a user equipment (UE), a base station (BS), and a network according to an embodiment of the present disclosure.

FIG. 15 is a flowchart illustrating a UE operation according to an embodiment of the present disclosure. Referring to FIG. 15, a UE may be configured with a plurality of BWPs for DL signal reception by a gNB (S1501). The plurality of BWPs may be configured by higher-layer signaling. The UE receives DCI and/or higher-layer signaling for activating a first BWP among the plurality of BWPs from the gNB (S1503), and receives a first PDSCH in the activated first BWP from the gNB (S1505). Subsequently, the UE receives DCI for switching the active BWP from the first BWP to a second BWP from the gNB (S1507), and receives a second PDSCH in the second BWP which is a new active BWP (S1509).

The UE transmits an HARQ-ACK for at least one of the first PDSCH received in the old BWP before the BWP switching or the second PDSCH received in the new BWP after the BWP switching (S1511). Herein, an HARQ-ACK configuration method and an HARQ-ACK transmitting method may be based on Embodiment 1 to Embodiment 4 as described later.

A gNB operation according to an embodiment of the present disclosure will be described with reference to FIG. 16. A gNB may configure a plurality of BWPs for a UE, for DL signal transmission (S1601). The plurality of BWPs may be configured by higher-layer signaling. The gNB transmits DCI and/or higher-layer signaling to the UE, for activating a first BWP among the plurality of BWPs (S1603), and transmits a first PDSCH in the activated first BWP to the UE (S1605). Then, the gNB transmits, to the UE, DCI for switching the active BWP from the first BWP to a second BWP (S1607), and transmits a second PDSCH in the second BWP, which is a new active BWP (S1609).

The gNB receives an HARQ-ACK for at least one of the first PDSCH transmitted in the old BWP before the BWP switching or the second PDSCH transmitted in the new BWP after the BWP switching (S1611). Herein, an HARQ-ACK configuration method and an HARQ-ACK reception method may be based on Embodiment 1 to Embodiment 4 as described later.

The operations illustrated in FIGS. 15 and 16 will be described from the perspective of a network with reference to FIG. 17. A gNB configures a plurality of BWPs for a UE, for DL signal transmission (S1701). The gNB transmits DCI and/or higher-layer signaling to the UE, for activating a first BWP among the plurality of BWPs (S1703), and transmits a first PDSCH in the activated first BWP (S1705). Then, the gNB transmits, to the UE, DCI for switching the active BWP from the first BWP to a second BWP (S1707), and transmits a second PDSCH in the second BWP, which is a new active BWP (S1709).

The UE transmits an HARQ-ACK for at least one of the first PDSCH transmitted in the old BWP before the BWP switching or the second PDSCH transmitted in the new BWP after the BWP switching (S1711). Herein, an HARQ-ACK configuration method and an HARQ-ACK reception method may be based on Embodiment 1 to Embodiment 4 as described later.

Embodiment 1

When the UE uses a semi-static HARQ-ACK codebook, the UE does not expect that BWP switching will take place. Alternatively or additionally, even though BWP switching takes place, the UE may expect that a PDCCH monitoring occasion set or DL association set linked to an HARQ-ACK feedback is not changed.

That is, in spite of BWP switching, a change in an HARQ-ACK codebook configuration may be avoided or may not be expected in Embodiment 1.

Embodiment 2

When a plurality of BWPs are configured for the UE, the UE determines whether to generate HARQ-ACK bits based on the union of PDCCH monitoring occasion sets or DL association sets for all configured BWPs in each cell. Specifically, when the UE uses a semi-static HARQ-ACK codebook, the UE may generate an HARQ-ACK bit for each PDCCH monitoring occasion in the union of PDCCH monitoring occasion sets or DL association sets for all configured BWPs. The number of HARQ-ACK bits may be 1 or 2 according to the number of TB s.

On the other hand, when the UE uses a dynamic HARQ-ACK codebook, the UE may generate an HARQ-ACK bit based on the union of PDCCH monitoring occasion sets or DL association sets for all configured BWPs, depending on whether a PDSCH is scheduled.

In Embodiment 2, the number of HARQ-ACK bits may be increased. Particularly in the case of a semi-static HARQ-ACK codebook, there may be too many HARQ-ACK bits. However, even when a BWP is dynamically switched, and a PDCCH monitoring occasion set, a PDCCH-to-PDSCH timing (set) and/or a PDSCH-to-HARQ-ACK feedback timing set is dynamically changed, Embodiment 2 is advantageous in that an HARQ-ACK configuration is not changed.

Embodiment 3

The UE may generate HARQ-ACK bits based on an active (DL) BWP at a corresponding HARQ-ACK feedback transmission timing. Alternatively or additionally, the UE may generate HARQ-ACK bits based on a (DL) BWP corresponding to the closest in timing of PDSCHs associated with an HARQ-ACK feedback.

Specifically, in the single-cell based case, an HARQ-ACK for a PDSCH scheduled in a previous BWP may be dropped, and not transmitted. In other words, when the UE configures an HARQ-ACK after an old BWP is switched to a new BWP, the UE may include an HARQ-ACK bit for a PDSCH scheduled in the new BWP in an HARQ-ACK configuration without including an HARQ-ACK bit for a PDSCH scheduled in the old BWP.

Additionally in CA, HARQ-ACK bits for a plurality of serving cells may be reordered, which may cause re-encoding of the HARQ-ACK feedback.

However, this problem may be avoided by setting a BWP switching period to be long enough, and not performing new (DL) scheduling in the BWP switching period. Otherwise, it may be expected that all of HARQ-ACK feedbacks for (DL) schedulings which are performed during switching between BWPs, (i.e., within a BWP switching period) are scheduled to correspond to the old BWP or the new BWP.

Further, the performance of HARQ-ACK feedback detection may be increased by generating as many HARQ-ACK bits as needed in Embodiment 3. Particularly in the case of a semi-static HARQ-ACK codebook, as many HARQ-ACK bits as needed may be generated.

Specifically, regarding generation of HARQ-ACK bits in the case of the semi-static HARQ-ACK codebook, only HARQ-ACK bits related to PDCCH monitoring occasions in a new BWP after BWP switching may be generated, without generating HARQ-ACK bits related to PDCCH monitoring occasions in an old BWP before the BWP switching. That is, among candidate PDSCH occasions in which PDSCH reception may be expected in a plurality of slots based on a PDSCH-to-HARQ feedback timing, as many HARQ-ACK bits as the number of candidate PDSCH occasions related to the new BWP may be generated.

In other words, the number of HARQ-ACK bits after the BWP switching may be less than that of HARQ-ACK bits when the BWP switching is not performed. However, when a predetermined time elapses after the BWP switching, all candidate PDSCH occasions related to an HARQ-ACK feedback may exist slots of the new BWP. With passage of time after the BWP switching, the number of HARQ-ACK bits may be increased again gradually. In other words, dropped bits for candidate PDSCH occasions associated with the old BWP may not be included in the HARQ-ACK bits.

Embodiment 4

When transmitting an HARQ-ACK feedback, the UE assumes that DL BWPs indicated by a PDCCH that schedules a PDSCH in a DL association set corresponding to the HARQ-ACK feedback are all the same, or PDCCH monitoring occasion sets or DL association sets for the HARQ-ACK feedback are identical.

In other words, a DL association set for an HARQ-ACK feedback at one time point may correspond to only one specific BWP in each cell. If HARQ-ACK feedbacks are distinguished from each other by an ACK/NACK resource indicator (ARI), it may be understood that different HARQ-ACK feedbacks are transmitted in different orthogonal cover codes (OCCs), and frequency/symbol regions, and it is assumed that a BWP associated with a DL association set is configured individually for each of different HARQ-ACK feedbacks.

In this case, a fallback operation may be needed within a BWP switching period. Specifically, in the NR system, the UE may receive only one piece of fallback DCI such as DCI format 1_0, and if a DAI value in the received fallback DCI is 1, transmit only an HARQ-ACK bit for the DCI.

Further, the fallback DCI may be transmitted in a common search space. Further, when the UE detects a PDCCH and/or a PDSCH in a first slot or first PDCCH monitoring occasion of a DL association set associated with HARQ-ACK, the UE may transmit only an HARQ-ACK bit for the PDSCH.

In another method, since BWP switching is indicated by non-fallback DCI, when the UE detects only one piece of DCI with DAI=1 irrespective of DCI formats, the UE may transmit only an HARQ-ACK bit for the PDSCH. The DCI with DAI=1 may be DCI that schedules the PDSCH. Specifically, if only one piece of DCI with DAI=1 is transmitted in an SCell even in CA, that is, other cells do not transmit DCI with DAI=1, the UE may transmit an HARQ-ACK bit for the PDSCH.

However, when the semi-static HARQ-ACK codebook is used, non-fallback DCI may not include any DAI field. Accordingly, only when a PDCCH that schedules a PDSCH is detected in a first PDCCH monitoring occasion corresponding to a DL association set for an HARQ-ACK in each cell, an HARQ-ACK bit for the PDSCH may be transmitted. That is, even when the semi-static HARQ-ACK codebook is configured, only an HARQ-ACK bit related to a fallback operation based on DCI with DAI=1 may be generated, instead of HARQ-ACK bits for all PDCCH monitoring occasions associated with the HARQ-ACK feedback. The UE may use the fallback operation based on the DCI with DAI=1 during a BWP switching period.

A different HARQ-ACK codebook generation method based on BWP switching may be performed depending on whether an HARQ-ACK codebook configured in the foregoing embodiments is a semi-static HARQ-ACK codebook or a dynamic HARQ-ACK codebook. Further, the embodiments of the present disclosure are not necessarily performed individually. Instead, two or more of the embodiments may be implemented in combination. That is, a plurality of methods in the embodiments may be used together. For example, a fallback operation may always be supported in an embodiment of the present disclosure.

Further, a DL association set for an HARQ-ACK may be identified according to a BWP index and/or ARI combination indicated by DCI. For example, when PDCCH monitoring occasions are partially overlapped between different BWPs, the UE may determine which BWP a DL association set to be referred to for generation of an HARQ-ACK codebook is based on, according to a BWP index and/or an ARI value in DCI transmitted in the overlapped area. That is, when PDCCH monitoring occasions are partially overlapped between different BWPs, PDCCHs corresponding to PDSCHs within a DL association set for a specific BWP may be identical in terms of BWP indexes and/or ARIs. Specifically, the ARI values may be distinguished from each other depending on whether the values of the ARI field are equal.

Further, if a PUCCH resource set that may be indicated by an ARI is different for each BWP, an HARQ-ACK codebook generation and transmission operation may be performed according to whether finally selected PUCCH resources are identical.

If BWP indexes are different and ARIs are identical, it may be considered to transmit HARQ-ACKs for PDSCHs corresponding to different BWPs on the same channel. Specifically, HARQ-ACKs for PDSCHs corresponding to different BWPs may be generated separately on a BWP basis and then concatenated so that the HARQ-ACKs are transmitted simultaneously. To reduce a payload size more efficiently, HARQ-ACKs may be generated for the union of DL association sets for the different BWPs.

In embodiments of the present disclosure, a semi-static HARQ-ACK codebook or a dynamic HARQ-ACK codebook may be configured UE-specifically irrespective of BWPs. If a codebook type is configured on a BWP basis, all UEs may have the same codebook configuration.

In the NR system, an HARQ-ACK codebook configuration method may be changed by higher-layer signaling. In this case, an operation method which may be performed without ambiguity between a UE and a gNB during an RRC reconfiguration period may be required. It may be considered to eliminate ambiguity between the gNB and the UE by performing the fallback operation described before in the foregoing embodiments during the period.

Regarding an HARQ-ACK codebook type, it may be determined whether to configure a semi-static HARQ-ACK codebook or a dynamic HARQ-ACK codebook according to a DL BWP and/or a UL BWP. Specifically, if the size of a DL association set for an HARQ-ACK feedback is different according to a DL BWP, the semi-static HARQ-ACK codebook or the dynamic HARQ-ACK codebook may be useful.

For example, if the DL association set is large, the size of an HARQ-ACK codebook may also be large. Accordingly, the dynamic HARQ-ACK codebook may be configured.

On the other hand, if the use of a DAI-based dynamic HARQ-ACK codebook may cause ambiguity due to a change in channel quality or an interference environment according to a DL BWP, the semi-static HARQ-ACK codebook may be used. In this case, as the UE dynamically changes a BWP, the HARQ-ACK codebook type may also be changed dynamically.

Basically, a PUCCH is transmitted in a PCell including a PSCell or a PUCCH-SCell. Therefore, an HARQ-ACK codebook type may be determined according to a (DL) BWP of the PCell. For example, only when an HARQ-ACK codebook configured for the BWP of the PCell is a dynamic HARQ-ACK codebook, a DAI field may exist in DCI of an SCell. However, fallback DCI may still have a counter-DAI field even in this case.

A DAI field may be generated or omitted based on a time of actual BWP switching. In HARQ-ACK feedback, the UE assumes that all DL BWPs indicated by PDCCHs within a DL association set corresponding to the HARQ-ACK feedback are identical. That is, it may be said that all DCI associated with the HARQ-ACK feedback is based on the assumption of a semi-static or dynamic HARQ-ACK codebook. Specifically, an HARQ-ACK feedback may be identified by a BWP index and/or an ARI value in DCI associated with the HARQ-ACK feedback, and DCI corresponding to the same HARQ-ACK feedback channel or the same HARQ-ACK feedback channel group may have the same BWP index and/or the same ARI value.

If a BWP switching period or a BWP is changed as is the case with a change of a search space configuration, a fallback operation may be performed. The fallback operation may refer to an operation based on DCI with DAI=1 or an operation of detecting DCI only in the first PDCCH monitoring occasion of a DL association set for a configured cell.

Figure 18:
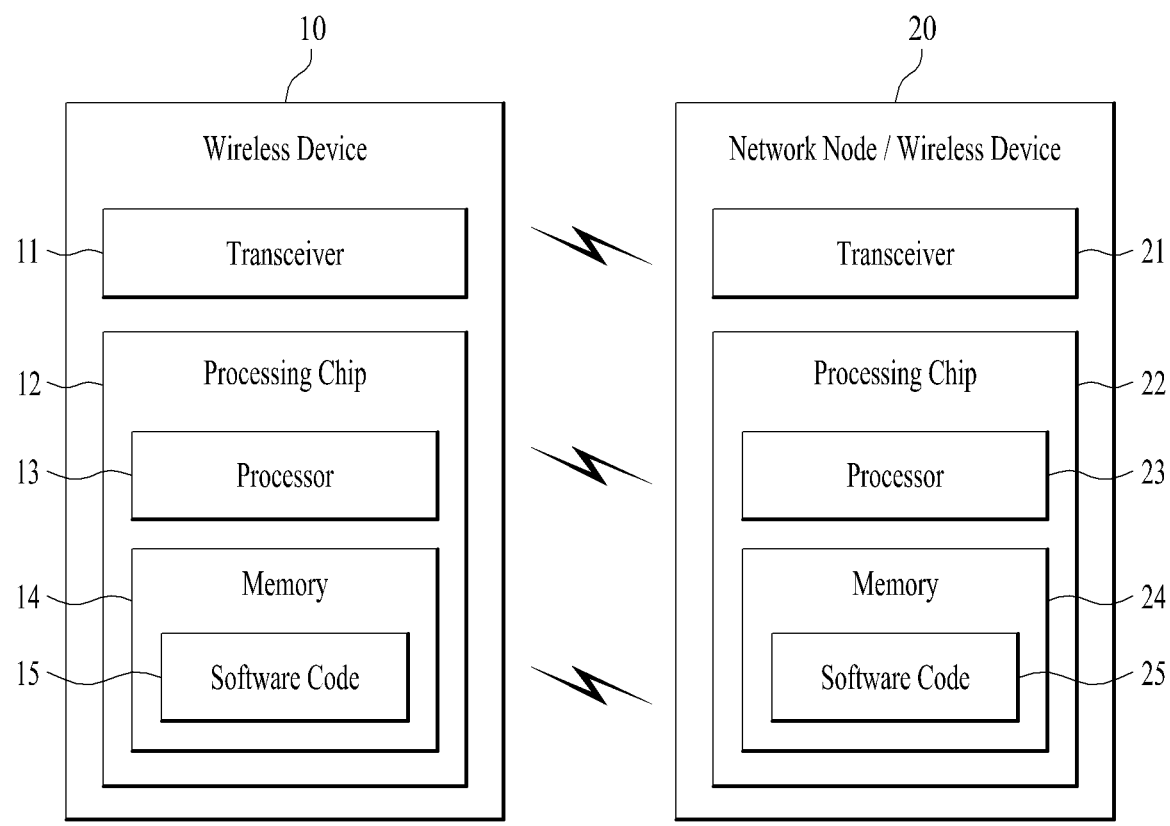
FIG. 18 is a block diagram of wireless devices for implementing the present disclosure.

FIG. 18 is a block diagram illustrating an example of communication between a wireless device 10 and a network node 20. Here, the network node 20 may be replaced with the wireless device of FIG. 18 or a UE.

In this specification, the wireless device 10 or the network node 20 includes a transceiver 11, 21 for communicating with one or more other wireless devices, network nodes, and/or other elements of the network. The transceivers 11 and 21 may include one or more transmitters, one or more receivers, and/or one or more communication interfaces.

In addition, the transceivers 11 and 21 may include one or more antennas. The antennas function to transmit signals processed by the transceivers 11 and 21 to the outside under control of the processing chips 12 and 22 or to receive wireless signals from the outside and transmit the signals to the processing chips 12 and 22, according to an embodiment of the present invention. The antennas are also referred to as antenna ports. Each antenna may correspond to one physical antenna or be configured by a combination of more than one physical antenna element. The signal transmitted from each antenna may not be further divided by the wireless device 10 or the network node 20. A reference signal (RS) transmitted for the corresponding antenna defines the antenna from the perspective of the wireless device 10 or the network node 20 and enables the wireless device 10 or the network node 20 to perform channel estimation for the antenna regardless of whether the channel is a single wireless channel from one physical antenna or a composite channel from a plurality of physical antenna elements including the antenna. That is, an antenna is defined such that a channel for delivering a symbol on the antenna may be derived from the channel through which another symbol on the same antenna is transmitted. A transceiver supporting a multi-input multi-output (MIMO) function to transmit and receive data using a plurality of antennas may be connected to two or more antennas.

In the present invention, the transceivers 11 and 21 may support reception beamforming and transmission beamforming. For example, in the present invention, the transceivers 11 and 21 may be configured to perform the functions illustrated in FIGS. 8 to 10.

In addition, the wireless device 10 or the network node 20 includes a processing chip 12, 22. The processing chips 12 and 22 may include at least one processor, such as a processor 13, 23, and at least one memory device, such as a memory 14, 24.

The processing chips 12 and 22 may control at least one of the methods and/or processes described herein. In other words, the processing chips 12 and 22 may be configured to implement at least one of the embodiments described herein.

The processors 13 and 23 include at least one processor for performing the function of the wireless device 10 or the network node 20 described herein.

For example, one or more processors may control the one or more transceivers 11 and 21 of FIG. 18 to transmit and receive information.

The processors 13 and 23 included in the processing chips 12 and 22 perform predetermined coding and modulation on signals and/or data to be transmitted to the outside of the wireless device 10 or the network node 20, and then transmit the signals and/or data to the transceivers 11 and 21. For example, the processors 13 and 23 convert a data sequence to be transmitted into K layers through demultiplexing, channel coding, scrambling, and modulation processes. The coded data sequence is also referred to as a code word and is equivalent to a transport block, which is a data block provided by the MAC layer. One transport block (TB) is coded into one code word, and each code word is transmitted to a reception device in the form of one or more layers. To perform frequency up-conversion, the transceivers 11 and 21 may include an oscillator. The transceivers 11 and 21 may include $N_t$ transmit antennas (where $N_t$ is a positive integer greater than or equal to 1).

In addition, the processing chips 12 and 22 include a memory 14, 24 configured to store data, programmable software code, and/or other information for implementing the embodiments described herein.

In other words, in the embodiments according to the present invention, when the memories 14 and 24 are executed by at least one processor, such as the processors 13 and 23, the memories allow the processors 13 and 23 to execute some or all of the processes controlled by the processors 13 and 23 of FIG. 18, or store software codes 15 and 25 including instructions for implementing the embodiments described herein based on FIGS. 1 to 17.

Specifically, the processing chip 12 of the wireless device 10 according to an embodiment of the present disclosure may control the transceiver 11 such that a plurality of BWPs are configured for DL signal reception by higher-layer signalling of a gNB. Herein, the processing chip 12 may control the transceiver 11 to receive DCI and/or higher-layer signalling for activating a first BWP among the plurality of BWPs from the gNB, and control the transceiver 11 to receive a first PDSCH in the activated first BWP. Then, the processing chip 12 controls the transceiver 11 to receive DCI for switching the active BWP from the first BWP to a second BWP, and controls the transceiver 11 to receive a second PDSCH in the new active BWP, that is, the second BWP. The processing chip 12 controls the transceiver 11 to transmit an HARQ-ACK for at least one of the first PDSCH received in the old BWP or the second PDSCH received in the new BWP. Herein, the processing chip 12 may configure an HARQ-ACK according to the foregoing Embodiment 1 to Embodiment 4, and control transmission of the configured HARQ-ACK through the transceiver 11.

Further, the processing chip 22 of the network node 20 according to an embodiment of the present disclosure may control the transceiver 21 such that a plurality of BWPs for DL signal transmission are configured for a UE by higher-layer signalling. The processing chip 22 may control the transceiver 21 to transmit DCI and/or higher-layer signaling for activating a first BWP among the plurality of BWPs to the UE, and control the transceiver 21 to transmit a first PDSCH in the activated first BWP. Then, the processing chip 22 controls the transceiver 21 to transmit DCI for switching the active BWP from the first BWP to a second BWP, and controls the transceiver 21 to transmit a second PDSCH in the new active BWP, that is, the second BWP.

The processing chip 22 then controls the transceiver 21 to receive from the UE an HARQ-ACK for at least one of the first PDSCH transmitted in the old BWP or the second PDSCH transmitted in the new BWP. Herein, an HARQ-ACK configuration method and an HARQ-ACK reception method may be based on the foregoing Embodiment 1 to Embodiment 4.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or gNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting an HARQ-ACK signal have been described in the context of the 5G NewRAT system, they are also applicable to various other wireless communication systems than the 5G NewRAT system.

What is claimed is:

1. A method of transmitting a hybrid automatic repeat request-acknowledgement (HARQ-ACK) signal by a user equipment (UE) in a wireless communication system, the method comprising:
    receiving, in a first bandwidth part (BWP), at least one first physical downlink shared channel (PDSCH);
    receiving downlink control information (DCI) for switching an active BWP related to a downlink signal from the first BWP to a second BWP;
    receiving, in the second BWP, at least one second PDSCH;
    obtaining a HARQ-ACK signal in response to the at least one first PDSCH and the at least one second PDSCH based on a semi-static HARQ-ACK codebook scheme; and
    transmitting, in a slot of the second BWP, the HARQ-ACK signal in response to the at least one first PDSCH and the at least one second PDSCH,
    wherein the HARQ-ACK signal (i) includes HARQ-ACK information for the at least one second PDSCH, and (ii) does not include HARQ-ACK information for the at least one first PDSCH, and
    wherein a size of the HARQ-ACK signal is only based on a number of candidate PDSCH reception occasions in at least one slot related to the second BWP among the candidate PDSCH reception occasions related to a feedback timing of the HARQ-ACK signal included in the at least one slot related to the second BWP and at least one slot related to the first BWP.

2. The method according to claim 1, wherein the HARQ-ACK signal is transmitted via a physical uplink control channel (PUCCH).

3. A communication apparatus configured to transmit a hybrid automatic repeat request-acknowledgement (HARQ-ACK) signal in a wireless communication system, the communication apparatus comprising:
    a memory; and
    a processor connected to the memory,
    wherein the processor is configured to control to:
    receive, in a first bandwidth part (BWP), at least one first physical downlink shared channel (PDSCH),
    receive downlink control information (DCI) for switching an active BWP related to a downlink signal from the first BWP to a second BWP,
    receive, in the second BWP, at least one second PDSCH,
    obtain a HARQ-ACK signal in response to the at least one first PDSCH and the at least one second PDSCH based on a semi-static HARQ-ACK codebook scheme, and
    transmit, in a slot of the second BWP, the HARQ-ACK signal in response to the at least one first PDSCH and the at least one second PDSCH,
    wherein the HARQ-ACK signal (i) includes HARQ-ACK information for the at least one second PDSCH, and (ii) does not include HARQ-ACK information for the at least one first PDSCH, and
    wherein a size of the HARQ-ACK signal is only based on a number of candidate PDSCH reception occasions in at least one slot related to the second BWP among the candidate PDSCH reception occasions related to a feedback timing of the HARQ-ACK signal included in the at least one slot related to the second BWP and at least one slot related to the first BWP.

4. The communication apparatus according to claim 3, wherein the HARQ-ACK signal is transmitted via a physical uplink control channel (PUCCH).

5. A method of receiving a hybrid automatic repeat request-acknowledgement (HARQ-ACK) signal by a base station (BS) in a wireless communication system, the method comprising:
    transmitting, in a first bandwidth part (BWP), at least one first physical downlink shared channel (PDSCH);
    transmitting downlink control information (DCI) for switching an active BWP related to a downlink signal from the first BWP to a second BWP;
    transmitting, in the second BWP, at least one second PDSCH; and
    receiving the HARQ-ACK signal in response to the at least one first PDSCH and the at least one second PDSCH,
    wherein the HARQ-ACK signal is based on a semi-static HARQ-ACK codebook scheme,
    wherein the HARQ-ACK signal (i) includes HARQ-ACK information for the at least one second PDSCH, and (ii) does not include HARQ-ACK information for the at least one first PDSCH,
    wherein a size of the HARQ-ACK signal is only based on a number of candidate PDSCH reception occasions in at least one slot related to the second BWP among the candidate PDSCH reception occasions related to a feedback timing of the HARQ-ACK signal included in the at least one slot related to the second BWP and at least one slot related to the first BWP.

* * * * *